(12) United States Patent
Petersohn et al.

(10) Patent No.: US 8,905,606 B2
(45) Date of Patent: Dec. 9, 2014

(54) FLAT LIGHT, IN PARTICULAR FOR AIRCRAFT CABINS

(75) Inventors: Jan Petersohn, Wendelstein (DE); Catharina Sauer, Aschaffenburg (DE); Matthias Brinkmann, Oberursel (DE); Steffen Bachmaier, Nuremberg (DE)

(73) Assignee: Diehl Aerospace GmbH, Uberlingen (DE)

( * ) Notice: Subject to any disclaimer, the term of this patent is extended or adjusted under 35 U.S.C. 154(b) by 167 days.

(21) Appl. No.: 13/371,625

(22) Filed: Feb. 13, 2012

(65) Prior Publication Data

US 2012/0224382 A1 Sep. 6, 2012

(30) Foreign Application Priority Data

Mar. 5, 2011 (DE) .......................... 10 2011 013 206

(51) Int. Cl.
*F21V 1/20* (2006.01)
*B60Q 3/02* (2006.01)
*F21V 8/00* (2006.01)
*B64D 11/00* (2006.01)

(52) U.S. Cl.
CPC .............. *B60Q 3/025* (2013.01); *G02B 6/0053* (2013.01); *B64D 2011/0038* (2013.01); *G02B 6/0051* (2013.01); *G02B 6/0038* (2013.01)
USPC .......................................... 362/471; 362/470

(58) Field of Classification Search
USPC .................................. 362/470–472, 600–634
See application file for complete search history.

(56) References Cited

U.S. PATENT DOCUMENTS

| | | | |
|---|---|---|---|
| 5,129,597 A * | 7/1992 | Manthey et al. | 362/471 |
| 5,381,309 A | 1/1995 | Borchardt | |
| 6,893,135 B2 | 5/2005 | Wright et al. | |
| 2007/0147036 A1 | 6/2007 | Sakai et al. | |
| 2008/0304273 A1 | 12/2008 | Clark | |
| 2009/0196069 A1* | 8/2009 | Iwasaki | 362/613 |
| 2010/0157615 A1* | 6/2010 | Gruhlke | 362/470 |
| 2010/0277951 A1* | 11/2010 | Kim et al. | 362/626 |
| 2012/0154450 A1* | 6/2012 | Aho et al. | 345/690 |

FOREIGN PATENT DOCUMENTS

| | | |
|---|---|---|
| DE | 6928091 U | 11/1969 |
| DE | 20 2007 006 707 U1 | 8/2007 |
| DE | 10 2007 020 397 A1 | 10/2008 |
| JP | 2003-157711 A | 5/2003 |

\* cited by examiner

*Primary Examiner* — William Carter
(74) *Attorney, Agent, or Firm* — Scully, Scott, Murphy & Presser, P.C.

(57) ABSTRACT

A flat light for aircraft cabins is provided. The flat light has a light box and a light source, the light of which is coupled into the light box. A rear wall of the light box is formed to be reflective and the front wall of the light box has optical elements for directional emission of light.

20 Claims, 2 Drawing Sheets

FLAT LIGHT, IN PARTICULAR FOR AIRCRAFT CABINS

BACKGROUND OF THE INVENTION

The invention relates to a flat light, in particular for aircraft cabins.

DISCUSSION OF THE PRIOR ART

According to the prior art, particularly in advertising as information panels, flat lights are used in which a light guide plate produced from a transparent plastic is provided with a lighting means for shining light in on at least one of its edges. Because of the total internal reflection on the two mutually opposite surfaces of the light guide plate, the volume of the light guide plate is illuminated substantially homogeneously.

However, the known flat lights are only limitedly suitable as illumination elements for e.g. aircraft cabins.

SUMMARY OF THIS INVENTION

It is in particular an object of the invention to provide an alternative flat light, in particular one which is as lightweight as possible, which is suitable as illumination particularly in aircraft cabins.

According to an aspect of the invention, a flat light is provided, which comprises:

a flatly formed light box having a light-transmissive front wall arranged on a light exit side and, opposite this, a rear wall formed so as to reflect in the direction of the front wall;

at least one light source which has at least one lighting means and is arranged and adapted so that light emerging from the at least one lighting means is coupled laterally into a light mixing chamber of the light box, which chamber is formed between the front wall and the rear wall;

wherein the side of the rear wall facing towards the light mixing chamber comprises reflection means which are formed and adapted to reflect at least a part of the light striking them;

and wherein the front wall comprises optical elements which are formed and adapted for directional emission of the light striking the front wall from the light mixing chamber.

The proposed flat light can be produced in a particularly flat form. Even with comparatively large dimensioning, for example with a luminous surface measuring of the order of half a square meter, one square meter or even several square meters, it is distinguished by a particularly homogeneous distribution of the luminous density. The proposed flat light, with a suitable selection of material for the walls of the light box, can be made particularly lightweight, in particular because of the light mixing chamber which is formed between the rear wall and the front wall and forms a kind of cavity. It is therefore suitable in particular as illumination in aircraft cabins and/or individual sections of an aircraft cabin. Nevertheless, the proposed flat light may also be used in the cabins of other means of transport, for example trains, buses and ships. Homogeneous, in particular directional emission of the light from the flat light can be achieved with the optical elements of the front wall.

The at least one light source may be arranged on a side edge of the light box on which light is coupled into the light mixing chamber. With a rectangular shape of the light box, for example, it is possible to arrange light sources on opposite side edges. In the case of a round shape of the light box, the light source may be arranged extending over the radial side edge. In this case, the lighting means of the light source may be radially distributed extending over the entire radial side edge. It is also possible for the lighting means to be provided merely in segments of the radial side edge, i.e. locally. In the latter case, in particular, a sufficient luminous density can also be achieved in the middle of the light box. The light source may also be arranged at a distance from the respective position where the light is coupled in, in which case corresponding light guide means, in particular light guides, may be provided which guide and redirect the light coming from the light source to the position where the light is coupled in. For the case in which the light source is arranged laterally with respect to the light mixing chamber, the light source may be placed laterally outside the rear wall and front wall. However, it is also possible for the light source to be arranged at least partially in an edge-side region between the rear wall and the front wall. In this case, the space remaining between the rear wall and the front wall is available as a light mixing chamber.

The light box, in particular the light mixing chamber, may be filled with a gaseous filling medium. Liquid and granular filling media may also be envisaged. The light box, in particular the light mixing chamber, is preferably filled with air, the light mixing chamber preferably not being sealed gas-tightly or air-tightly from the surroundings, and at least one opening being provided for communication of the light mixing chamber with the surroundings.

The flat light, in particular the light box or the light mixing chamber, may for example have a rectangular, triangular, round or oval shape. The shape and geometry of the light emission surface may, for example, also be configured with additional shades and/or covers. The optical elements and/or reflection means may be arranged on the front wall or rear wall, for example in a regular pattern, for example in rows and columns. Particularly in the case of round flat lights, the optical elements and/or reflection means may be arranged in a pattern taking the round geometry into account, for example in concentric circles, annular rings, in circle segments, etc.

According to one embodiment, at least that or those side walls of the light box which are not used for the light coupling are formed to be reflective on the side facing towards the light mixing chamber. In this way, it is possible to avoid undesirable lateral emergence of light and concomitantly a reduction of the light emission through the front side.

According to another embodiment, the rear wall, the front wall and/or the side wall or side walls may be formed from a plastic, which is in particular transparent or transmissive depending on requirements, in particular from PMMA, Plexiglas or polycarbonate. Such materials permit a particularly lightweight structure of the flat light.

It may also be advantageous for there to be light-scattering particles in the plastic, in particular the light-transmissive front wall. In this case, the quantity and size of the light-scattering particles are preferably dimensioned so that sufficient transparency of the front wall is maintained with a view to the intended illumination task. According to another embodiment, the light-scattering particles may be formed from an intumescent material. Intumescent materials are substances which retard the development of a flame in case of fire. The proposed particles may thus fulfil on the one hand the function of a light-scattering material, and on the other hand the function of a flame-retardant material. Expediently, the light-scattering particles have an average particle diameter in the range of from 10 to 100 μm. A refractive index of the light-scattering particles is advantageously greater than a refractive index of the plastic used to produce the front wall and/or rear wall. The light-scattering particles may be contained in a separate layer, in particular an interlayer, which, in the case of an interlayer, is applied onto the front wall or rear wall in addition to other layers or optical elements.

According to another embodiment, the flat light comprises a first refractive optical device placed after the at least one lighting means, preferably arranged between the light mixing chamber and the lighting means, for focusing and directing the light emerging from the at least one lighting means into the light box. In this way, it is possible for the light to be coupled optimally into the light box, particularly with a view to sufficiently homogeneous light emission from the front wall.

According to a preferred refinement, the first refractive optical device comprises a cylindrical lens. The cylindrical lens may in this case be arranged so that it extends parallel to that side edge of the light box on which the light is coupled in. Expediently, the cylindrical lens is configured so that the light thereby coupled into the light box travels obliquely by at most ±10°, preferably at most ±5°, with respect to the surface of the light exit side of the front wall and/or the light reflection side of the rear wall. As a result of this, the light can penetrate deeply into the light guide plate, so that light can be coupled in sufficiently even in the middle of the light box and optionally as far as the side lying opposite the coupling side.

Provision is made in another embodiment for the optical elements of the front wall to comprise a second refractive optical device which is formed and adapted to deviate the light striking the front wall in the direction of the light exit side. A third refractive optical device placed after the second refractive optical device may also be provided, which is formed and adapted to increase the exit angle of the light emerging on the light exit side. With the second and third refractive optical devices, the desired directional and homogeneous emission of the light from the front wall of the light box can be achieved, and suitably adjusted with appropriate selection of the optical elements.

In one embodiment, the lighting means may comprise at least one fluorescent tube and/or at least one electroluminescent element. The electroluminescent element may, in particular, be an LED (LED: light-emitting diode) or an OLED (OLED: organic light-emitting diode). It is furthermore possible for the lighting means, in particular the electroluminescent elements, to be provided in different colours, preferably in order to span a colour space. Colour spaces which may be envisaged are, in particular, the additive colour spaces RGB (red-green-blue), RGBW (red-green-blue-white) and/or the subtractive colour spaces CMY (cyan, magenta, yellow), CMYW (cyan, magenta, yellow, white).

The aforementioned lighting means, in particular LEDs and OLEDs, consume little electrical energy and have a sufficient luminous intensity. They are furthermore lightweight and suitable in particular for the production of a flat light to illuminate aircraft cabins. When using lighting means of different colours, it is possible in particular to selectively adjust the colour of the light emitted by the flat light or modify it along a curve in the respective colour space, in particular continuously.

In another embodiment, the light source may comprise a reflection device which is formed and adapted to reflect the light emerging from the at least one lighting means in the direction of the first refractive optical device. With the reflection device, in particular, the light generated by a lighting means can be directed essentially fully, or at least for the most part, onto the first refractive optical device and coupled into it. The reflection device, which preferably at least partially encloses the respective lighting means, may comprise a reflective varnish, a reflective film, in particular a metal foil, a reflective metal sheet or the like.

In one refinement, the second refractive optical device may comprise a first array of optical prisms, pyramids and/or cones, in particular a prism array. Preferably, the optical prisms, pyramids and/or cones preferably have length and/or width dimensions, in the plane of the front wall, of about 1 mm or less, in particular about 0.5 mm or less. Such a first array, in particular with regular optical prisms, pyramids and/or cones, is particularly suitable for deviating the light, obliquely striking the side of the front wall facing towards the light box, into a direction essentially extending perpendicularly to the front wall, or the light exit side.

In another embodiment, the third refractive optical device comprises a second array of lenses, in particular lenticular lenses. In particular with lenticular lenses, the light coming from the second refractive optical device can be refracted to exit angles of for example at least ±25°, preferably at least ±30°, with respect to a normal to the front wall, or more precisely the light exit side of the front wall. Particularly homogeneous light emission can be achieved in particular.

According to a particularly advantageous embodiment, the first array and the second array are configured so that in each case one optical prism, one optical pyramid and/or one optical cone is placed after each lens, in particular lenticular lens; or that spacings between the optical prisms, pyramids and/or cones of the first array and spacings between the lenses of the second array differ from one another so that perturbing interferences can essentially be avoided at least for a substantial part of the respective wavelength spectrum. Particularly favourable output of the light from the light box can be achieved, in particular together with a comparatively high luminous efficiency.

It is advantageous in terms of manufacturing technology when, in another embodiment, the second and/or third refractive optical device is/are formed as a film. Such a film or such films can be applied onto the front wall by simple adhesive bonding. It is however also possible, for example, for the first array and optionally the second array to be moulded directly into the light exit side of the front wall, or for the first array to be moulded directly into the light exit side of the front wall and for a film comprising the second array to be adhesively bonded thereon.

According to another embodiment, the reflection means of the rear wall comprise reflectors, in particular mirrors or reflective elements, particularly in a sawtooth-like structure, roughened surfaces, colourations and/or coloured elements, for example coloured adhesive elements, for example in strip form. By using the respectively suitable reflection means, the respectively required specular or diffuse reflection can be achieved, i.e. correspondingly configured, in particular locally.

The reflection means may be at least partially formed as films, in particular adhesively bondable films, coatings, in particular varnish coatings, and/or printings. In particular, such reflection means may be fitted or applied so that, according to another embodiment, the optical properties of the reflection means on the rear wall, in particular the periodicity of the structures of the reflection means, vary in a direction parallel to the rear wall.

In a preferred refinement, the reflection means are formed, adapted and/or distributed so that their diffusivity in reflection varies, preferably continuously, preferably in such a way that, at least in subregions of the rear wall, the diffusivity in reflection increases with an increasing distance from a lighting means and/or the diffusivity decreases with a decreasing distance from a lighting means. With such an embodiment, it is possible in particular to configure regions near positions where the light is coupled into the light box, and in particular side edges, with a lower diffusivity in reflection, and regions which are further away from the positions where the light is coupled with a higher diffusivity.

In this way, in particular, it is possible for the light coupled in to be able to penetrate sufficiently deeply into the light box and for the illumination, in particular light emission, to be sufficiently homogeneous over essentially the entire light-transparent front wall. In regions close to the light coupling, the reflection means may in particular be formed so that the specular component of the reflection by the rear wall, preferably with a privileged direction into the light box, predominates. With an increasing distance from the light coupling, the specular component of the reflection may be reduced in favour of the diffuse component of the reflection. The diffuse reflection in the regions remote from the light coupling is preferably selected so that the light reaching them directly or by reflection is reflected optimally in the direction of the front wall.

The aforementioned variation of the reflection properties is advantageous in particular when the light is coupled into the light box only on one side or side edge, while no coupling of light takes place on the opposite side. Even in cases in which the light coupling takes place through two opposite sides, however, it is advantageous to vary the reflection properties correspondingly in order to achieve a sufficient luminous density, particularly in the middle of the light box.

Furthermore, the aforementioned variation of the reflection properties is particularly advantageous in an embodiment with a light box formed so as to be curved, i.e. in particular when the front wall and rear wall have corresponding curvatures, preferably with an essentially constant mutual spacing. Therefore, the proposed flat light may be formed not only as a planar light but also arbitrarily curved, in particular concavely, convexly etc. Curved flat lights may be envisaged particularly for ceiling illumination of passenger cabins, since these are or should often be formed so as to be curved in the region of the ceiling, in a manner corresponding to the outer contour of the respective means of transport.

Another independent claim provides an interior furniture element for a passenger cabin or a section of a passenger cabin of a means of transport, in particular an aircraft. The interior furniture element may in particular be formed as a cladding or wall element, in particular ceiling cladding. The interior furniture element comprises at least one flat light formed as proposed above or according to one of the embodiments.

The flat light, particularly in one of the embodiments, may for example supplement or replace a conventional ceiling panel.

In one embodiment of the interior furniture element, the light source is arranged laterally with respect to the light mixing chamber, and the light source is covered on the visible side by a cover shade. In particular, the light source, particularly the one or more lighting means, may be covered on the visible side, i.e. as seen from the passenger or transport compartment, by a cover shade extending as far as the light exit side of the flat light. In this case, the cover shade and the flat light may form an essentially continuous contour. This facilitates cleaning of the aircraft cabin. In contrast to conventional indirect illumination of an aircraft cabin, in which a slot for the light to emerge is provided between the cover shade and the ceiling panel, as well as additional acoustic insulation necessary because of this, according to the present invention the provision of such acoustic insulation can be obviated. It is also possible for the light source to be covered on the visible side at least partially by adjacent or neighbouring interior furniture elements, in particular ceiling elements or cladding elements.

According to an advantageous embodiment, the cover shade extends from a housing component of a luggage locker housing or is a component of a ceiling panel. This, for example, further simplifies the production and mounting of the ceiling cladding, in particular for aircraft cabins.

BRIEF DESCRIPTION OF THE DRAWINGS

Exemplary embodiments of the invention will be explained in more detail below with the aid of the drawings, in which.

DETAILED DESCRIPTION OF THE INVENTION

Figure 1:
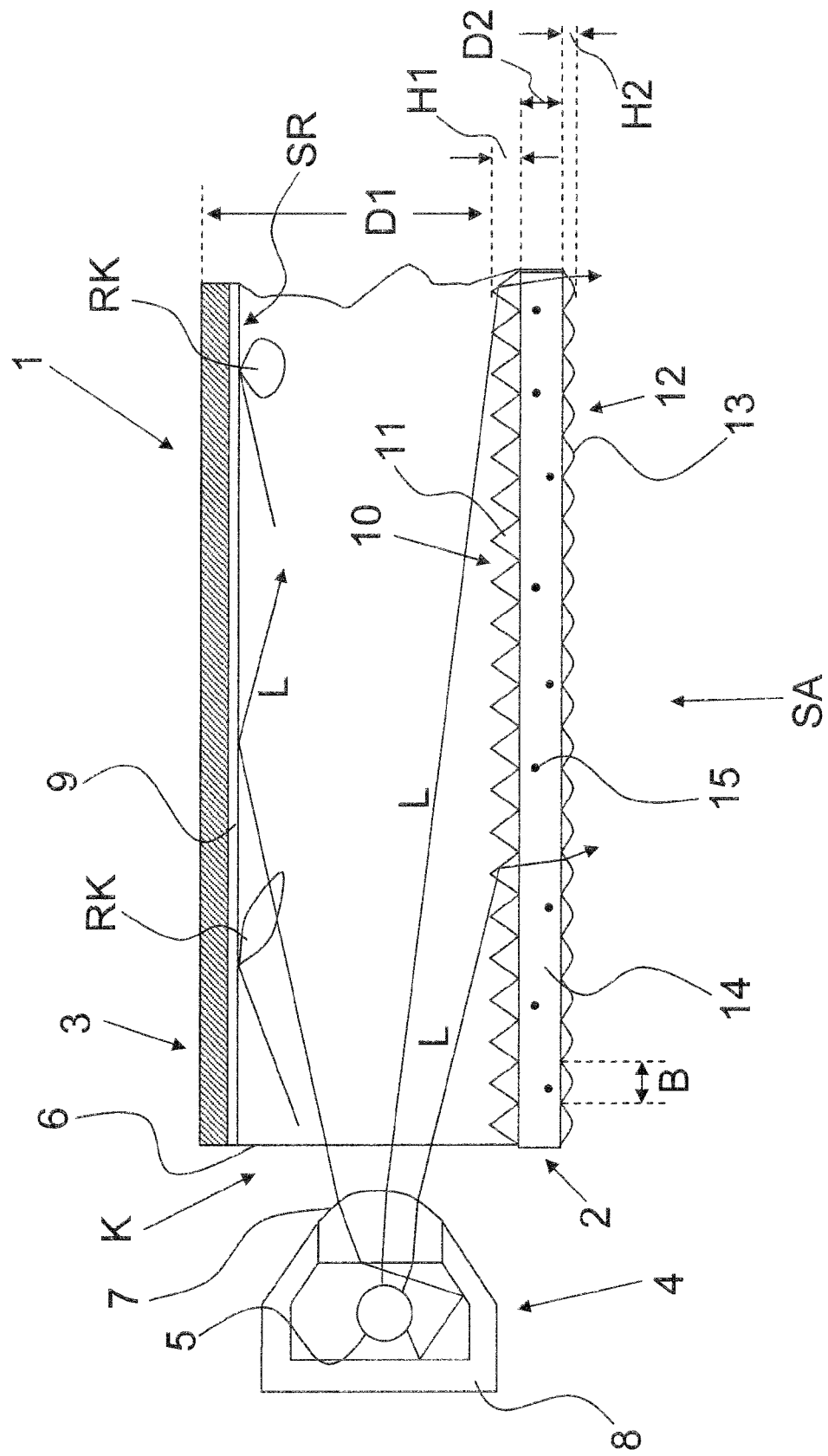
FIG. 1 shows a partial view through a flat light and
FIG. 2 shows a schematic partial view through ceiling cladding of an aircraft cabin.

FIG. 1 shows a partial view through a flat light. The flat light comprises a light box 1 having a light-transmissive front wall 2 arranged on a light exit side SA. The flat light furthermore comprises a rear wall 3 formed so as to reflect in the direction of the front wall 2. The front wall 2 and the rear wall 3 may for example be made of a plastic, in particular PMMA. A light reflection side of the rear wall 3 is denoted by the reference symbol SR. A side edge of the flat light is denoted by the reference symbol K. A first thickness D1 of the flat light may be from 30 to 60 mm.

A light source 4 comprising a multiplicity of light-emitting diodes 5 arranged in an array, in particular a linear array, is arranged on the side edge K so that the light L generated by the light-emitting diodes can be coupled into the light box 1 through the side edge K, in particular a light entry window 6 provided on the side edge K. The light-emitting diodes may for example be arranged in rows and columns, or in any other desired pattern suitable for optimal colour mixing in the case of coloured light-emitting diodes.

The light source 4 furthermore comprises a cylindrical lens 7 placed after the light-emitting diodes 5 in the beam direction. The light source 4 furthermore comprises a reflector 8, which at least partially encloses the light-emitting diodes 5 and reflects the light L generated by the light-emitting diodes 5 in the direction of the cylindrical lens 7.

On the light reflection side SR, the rear wall 3 has a reflective layer 9 which reflects the light L striking it in the direction of the light exit side SA with a certain proportion of diffuse reflection depending on the distance from the light source 4. In the vicinity of the light source 4, the reflective layer 9 has a low proportion of diffuse reflection, i.e. a higher proportion of specular reflection, preferably with a privileged direction into the light box 1, whereas regions further away from the light source 4 exhibit an increasingly large proportion of diffuse reflection as schematically illustrated in FIG. 1 by the reflection cone RK. By virtue of the respective reflection properties, it is possible to ensure that the light penetrates sufficiently deeply into the light box 1 and is optimally reflected in the direction of the front wall 2, so that essentially homogeneous light emission can be achieved on the light exit side.

The light exit side SA is provided with a prism array 10, which is formed by a multiplicity of prisms 11 arranged next to one another. The prism array 10 may be produced integrally with the front wall 2. It may also be a component of a film adhesively bonded onto the front wall 2. A first height H1 of the prisms 11 may, for example, be from 0.1 to 0.3 mm. A width B in the light propagation direction of the prisms 11, which are open towards the light exit side SA, may be from 0.2 to 0.8 mm, preferably from 0.3 to 0.5 mm.

A lenticular lens array 12 is placed after the prism array 10 in the beam path. The lenticular lens array 12 is formed by a multiplicity of lenticular lenses 13. Each of the lenticular lenses 13 is respectively assigned to one prism 11. In the present case, particularly for representational simplicity, the prism array 10 and the lenticular lens array 12 are formed in a manner corresponding to one another and are arranged congruently. In a non-congruent arrangement, however, in order to avoid perturbing interferences, it is particularly advantageous for the distance between neighbouring prisms 11 to be different from the spacing of neighbouring lenticular lenses 13, at least in such a way that essentially no perturbing interferences occur for the respectively dominant wavelengths of the light.

A second height H2 of the lenticular lens array 12 may be from 0.1 to 0.3 mm. The second height H2 may correspond approximately to a radius of the lenticular lenses 13.

Between the lenticular lens array 12 and the prism array 10, an optically transparent interlayer 14 formed as a bulk scatter may be provided for homogenization of the light emission, the second thickness D2 of which may be from 1 mm to 1.5 mm. The interlayer 14 may contain light-scattering particles 15 which, for example, may be formed so as to facilitate inter alia colour mixing and therefore possibly additional homogenization of the emerging light L. The particles 15 may have an average diameter in the range of from 10 to 100 µm. They are expediently made of a material whose refractive index is higher than the refractive index of the surrounding material, or the material of the front wall 2. The light-scattering particles 15 may, in particular, be made of an intumescent material which has a flame-retardant effect.

A light beam L emerging from the light-emitting diodes 5 is coupled into the light box 1 through the cylindrical lens 7, optionally after reflection on the reflector 8. The light coupling is preferably carried out at an angle of at most 5° with respect to the lengthwise direction of the light reflection side SR, or the light exit side SA which preferably extends parallel thereto. The light beam L strikes a prism 11 of the prism array 10 either directly or after single or multiple reflection on the light reflection side SR. The light beam L is deviated in the direction of the light exit side SR by the effect of the prism 11, passes through the interlayer 14 and is finally refracted away from the normal to the light exit side SA by a lenticular lens 13 placed after it in the beam path. The prisms 11, the interlayer 14 and the lenticular lenses 13 are preferably formed in such a way that the light beam L emerges at an exit angle of about 30° or less with respect to the normal.

The space between the front wall 2 and the rear wall 3 forms a light mixing chamber in which, besides propagation and distribution of the light L, sufficient mixing of the light L can also take place. Mixing of the light L is particularly advantageous when using multicoloured light-emitting diodes 5, for example to span an RGB or RGBW colour space, so that homogeneous light emission with respect to luminous intensity as well as light colour can be achieved in particular on the light exit side. The light mixing chamber may be filled with air or another suitable gaseous filling medium.

Figure 2:
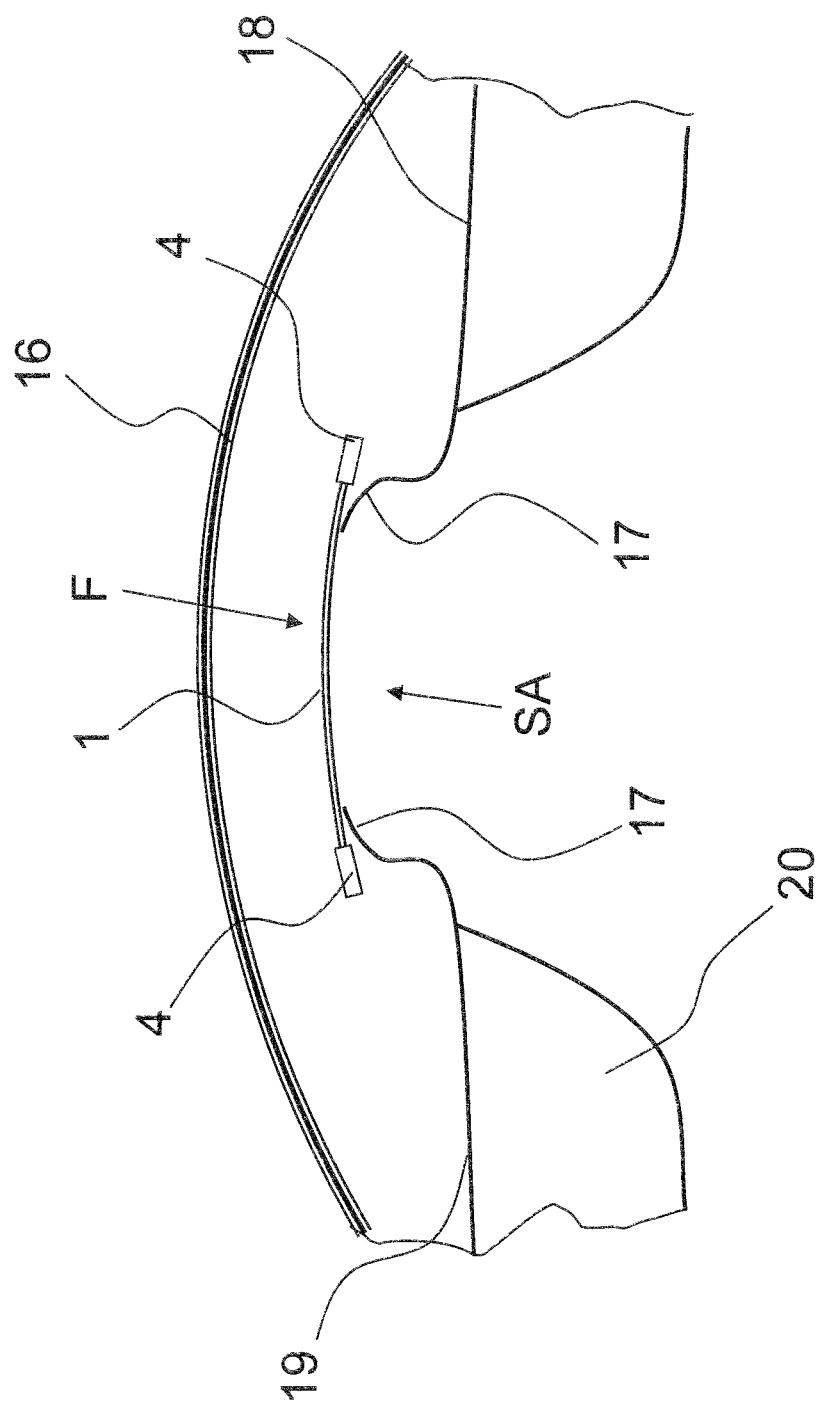

FIG. 2 schematically shows a sectional view through ceiling cladding of an aircraft cabin. An outer skin of an aircraft fuselage is denoted by the reference symbol 16. A flat light F, for example such as was described in FIG. 1, is fastened thereon using a fastening means (not shown in detail here). The flat light F in this case respectively has a light source 4 on two mutually opposite side edges K, the light L generated by which is coupled into the light box 1 and therefore the light mixing chamber as described with reference to FIG. 1. The light sources 4 are respectively covered on the visible side by shades 17 which extend as far as the light exit side SA of the flat light F. The shades 17 may be a component of a ceiling panel 18. A shade 17 may also extend from one housing component 19 of a housing of a luggage locker 20. The shades 17 may also be configured separately and connected to the ceiling panel 18 or the housing component 19 of the luggage locker 20.

As can be seen from FIG. 2, a continuous contour is obtained overall by the shades 17 adjoining the light exit side SA. The provision of noise decoupling means, as is necessary according to the prior art, can therefore be obviated. Furthermore, the proposed continuous contour in the region of the flat light can be cleaned easily. Apart from this, such a continuous contour makes it impossible to conceal objects such as weapons, drugs and the like in the region of the ceiling cladding.

In the example of FIG. 2, the flat light F, or more precisely the light box 1, is formed to be curved so as to match the contour of the outer skin 16. In particular owing to the formation of the light box as described above, particularly the front wall 2 and the rear wall 3, especially with suitable adjustment of the specular and diffuse components of the reflection, homogeneous light output can be achieved on the light exit side even with a curved geometry even though certain regions of the light box 1, in particular of the front wall 2, the prism array 10 and the lenticular lens array 13 may possibly not be illuminated directly by the light sources 4. In the case as shown in FIG. 2, in which a light source 4 is respectively provided on opposite side edges K, the diffuse component of the reflection of each of the side edges K may increase, in particular continuously, starting from the middle of the light box, while simultaneously the specular component of the reflection decreases, preferably continuously. On the other hand, in the case of a flat light F in which light is coupled in only on one of two opposite side edges K, the diffuse component of the reflection of that side edge K on which the light is coupled into the light box 1 may increase in the direction of the opposite side of the light box 1, in particular continuously, while the specular component of the reflection simultaneously decreases, in particular continuously.

LIST OF REFERENCES 1 light box
2 front wall
3 rear wall
4 light source
5 light-emitting diode
6 light entry window
7 cylindrical lens
8 reflector
9 reflective layer
10 prism array
11 prism
12 lenticular lens array
13 lenticular lens
14 interlayer
15 light-scattering particle
16 outer skin
17 shade
18 ceiling panel
19 housing component
20 luggage locker B width
D1, D2 first, second thickness
F flat light
H1, H2 first, second height
K side edge
L light
RK reflection cone
SA light exit side
SR light reflection side

What is claimed is:

1. A flat light for an aircraft cabin, comprising:
    a flatly formed light box comprising a light-transmissive front wall arranged on a light exit side and an opposite rear wall formed to reflect light in a direction toward the front wall, wherein a light mixing chamber is defined between the front wall and the rear wall, the light mixing chamber being in the form of a cavity filled with a fluid medium; and
    at least one light source which comprises at least one lighting means, the light source being configured such that light emerging from the at least one lighting means is coupled laterally into the light mixing chamber;
    wherein the side of the rear wall facing towards the light mixing chamber comprises reflection means which is configured to reflect at least a part of the light striking the reflection means; and
    wherein the front wall comprises optical elements which are configured for directional emission of the light striking the front wall from the light mixing chamber into the aircraft cabin.

2. The flat light according to claim 1, wherein one or more side walls of the light box, which are not used for the light coupling, are formed to be reflective on the side facing towards the light mixing chamber.

3. The flat light according to claim 1, wherein at least one of the rear wall, the front wall and a side wall of the light box is formed from a plastic wherein the plastic comprises at least one of PMMA, Plexiglas and polycarbonate, and wherein the plastic of the light-transmissive front wall comprises light-scattering particles in an interlayer, which particles have an average particle diameter in the range of from 10 to 100 µm.

4. The flat light according to claim 1, comprising a first refractive optical device placed after the at least one lighting means and arranged between the light mixing chamber and the lighting means, for focusing and directing the light emerging from the at least one lighting means into the light box, wherein the first refractive optical device comprises a cylindrical lens.

5. The flat light according to claim 1, wherein the optical elements of the front wall comprise:
    a second refractive optical device which is configured to deviate the light striking the front wall in the direction of the light exit side, and
    a third refractive optical device which is placed after the second refractive optical device and is configured to increase the exit angle of the light emerging on the light exit side, and
    a transmissive interlayer formed as a bulk scatter, arranged between the second refractive optical device and the third refractive optical device.

6. The flat light according to claim 5, wherein the second refractive optical device comprises a first array of optical prisms, wherein the optical prisms have length and width dimensions of about 1 mm or less.

7. The flat light according to claim 6, wherein the third refractive optical device comprises a second array of lenses.

8. The flat light according to claim 7, wherein the first array and he second array are configured so that one optical prism is placed after each lens.

9. The flat light according to claim 7, wherein at least one of the second and third refractive optical device is formed as a film.

10. The flat light according to claim 7, wherein spacings of the optical prisms of the first array and spacings of the lenses of the second array differ from one another so that perturbing interferences are essentially avoided at least for a substantial part of the respective wavelength spectrum.

11. The flat light according to claim 1, wherein the lighting means comprises at least one of a fluorescent tube and an electroluminescent element.

12. The flat light according to claim 1, wherein the light source comprises a reflection device which is configured to reflect the light emerging from the at least one lighting means in a direction toward the first refractive optical device.

13. The flat light according to claim 1, wherein the reflection means of the rear wall comprise reflectors and wherein the reflectors comprise reflective elements having at least one of a sawtooth-like structure, roughened surfaces, and colored elements.

14. The flat light according to claim 13, wherein the reflection means is at least partially formed as at least one of films, coatings and printings.

15. The flat light according to claim 13, wherein the optical properties of the reflection means vary in a direction parallel to the rear wall.

16. The flat light according to claim 1, wherein the reflection means is configured so that the diffusivity in reflection of the reflection means varies continuously, in such a way that, at least in subregions of the rear wall, the diffusivity in reflection increases with an increasing distance from the position where the light is coupled into the light mixing chamber and/or the diffusivity decreases with a decreasing distance from the position where the light is coupled into the light mixing chamber.

17. The flat light according to claim 1, wherein at least one of the rear wall and the front wall is formed to be curved, wherein a distance between the rear wall and the front wall is essentially constant.

18. An interior furniture element for a passenger cabin or a section of a passenger cabin of a means of transport, wherein the interior furniture element is formed as a cladding or wall element, and wherein the interior furniture element comprises at least one flat light according to claim 1.

19. The interior furniture element according to claim 18, wherein the light source is arranged laterally with respect to the light mixing chamber, and wherein the light source is covered on the visible side by a cover shade.

20. The interior furniture element according to claim 19, wherein the cover shade extends from a housing component of a luggage locker housing or is a component of a ceiling panel.

* * * * *